Oct. 31, 1967 E. M. BLOOM, JR., ET AL 3,349,695

UNIVERSAL CHARACTER SET ADDRESSING IN HIGH SPEED PRINTERS

Filed July 12, 1965 7 Sheets-Sheet 1

INVENTORS
EARL M. BLOOM, JR
VICTOR J. FAIDLEY
BY Francis V. Giolma
ATTORNEY

| | | T1 | | | | | | | | | | $\overline{T1}$ | | | | | | | | | |
|---|---|---|---|---|---|---|---|---|---|---|---|---|---|---|---|---|---|---|---|---|---|
| | | DE 0 | AD 1 | AE 2 | BE 3 | AB 4 | AC 5 | BC 6 | BD 7 | CD 8 | CE 9 | DE 0 | AD 1 | AE 2 | BE 3 | AB 4 | AC 5 | BC 6 | BD 7 | CD 8 | CE 9 |
| U1 | AD | 1 | 13 | 25 | 37 | 49 | 61 | 73 | 85 | 97 | 109 | 121 | 133 | 145 | 157 | 169 | 181 | 193 | 205 | 217 | 229 |
| | A$\overline{D}$ | 3 | 15 | 27 | 39 | 51 | 63 | 75 | 87 | 99 | 111 | 123 | 135 | 147 | 159 | 171 | 183 | 195 | 207 | 219 | 231 |
| | BD | 5 | 17 | 29 | 41 | 53 | 65 | 77 | 89 | 101 | 113 | 125 | 137 | 149 | 161 | 173 | 185 | 197 | 209 | 221 | 233 |
| | B$\overline{D}$ | 7 | 19 | 31 | 43 | 55 | 67 | 79 | 91 | 103 | 115 | 127 | 139 | 151 | 163 | 175 | 187 | 199 | 211 | 223 | 235 |
| | CD | 9 | 21 | 33 | 45 | 57 | 69 | 81 | 93 | 105 | 117 | 129 | 141 | 153 | 165 | 177 | 189 | 201 | 213 | 225 | 237 |
| | C$\overline{D}$ | 11 | 23 | 35 | 47 | 59 | 71 | 83 | 95 | 107 | 119 | 131 | 143 | 155 | 167 | 179 | 191 | 203 | 215 | 227 | 239 |
| $\overline{U1}$ | AD | 2 | 14 | 26 | 38 | 50 | 62 | 74 | 86 | 98 | 110 | 122 | 134 | 146 | 158 | 170 | 182 | 194 | 206 | 218 | 230 |
| | A$\overline{D}$ | 4 | 16 | 28 | 40 | 52 | 64 | 76 | 88 | 100 | 112 | 124 | 136 | 148 | 160 | 172 | 184 | 196 | 208 | 220 | 232 |
| | BD | 6 | 18 | 30 | 42 | 54 | 66 | 78 | 90 | 102 | 114 | 126 | 138 | 150 | 162 | 174 | 186 | 198 | 210 | 222 | 234 |
| | B$\overline{D}$ | 8 | 20 | 32 | 44 | 56 | 68 | 80 | 92 | 104 | 116 | 128 | 140 | 152 | 164 | 176 | 188 | 200 | 212 | 224 | 236 |
| | CD | 10 | 22 | 34 | 46 | 58 | 70 | 82 | 94 | 106 | 118 | 130 | 142 | 154 | 166 | 178 | 190 | 202 | 214 | 226 | 238 |
| | C$\overline{D}$ | 12 | 24 | 36 | 48 | 60 | 72 | 84 | 96 | 108 | 120 | 132 | 144 | 156 | 168 | 180 | 192 | 204 | 216 | 228 | 240 |

United States Patent Office 3,349,695
Patented Oct. 31, 1967

3,349,695
UNIVERSAL CHARACTER SET ADDRESSING IN HIGH SPEED PRINTERS

Earl M. Bloom, Jr., Endicott, and Victor J. Faidley, Apalachin, N.Y., assignors to International Business Machines Corporation, Armonk, N.Y., a corporation of New York Filed July 12, 1965, Ser. No. 470,964
5 Claims. (Cl. 101—93)

ABSTRACT OF THE DISCLOSURE

A character storage device having the addresses arranged in four different groups by switch means for energizing each of the X and Y drive lines, arranged in four groups by means of set lines which are energized from two triggers to provide set signals to one or the other of two groups of switch means for each of the X and Y drive lines. Registers provide bias signals to the switch means of one each of the X and Y drive lines in each group for selecting a particular X and Y drive line of the selected group.

This invention relates generally to printing, and has reference in particular to the addressing of a character register in a high speed printer.

"On-the-fly" printers as heretofore proposed comprise a type carrier (such as a continuous type of chain/train) that moves at a constant speed parallel to the print line as a paper web is fed intermittently transverse of the print line through a throat defined between the type chain/train and a bank of print hammers. Any one of a plurality of such type carriers may be selectively installed, each with a distinctive code arrangement that may include repeated sets of graphic symbols up to the full type capacity of the carrier. Thus, if a "48 AN" (48 character alphanumeric) type carrier is used having 26 upper case alphabetic characters, 10 numerals, and 12 special characters, and the type carrier has a capacity of 240 graphic symbols total, then the 48 AN code can be repeated five times on such a carrier.

A particular form of print control apparatus for an "on-the-fly" printer is disclosed in Patent No. 2,993,437, which issued July 25, 1961 to F. M. Demer et al., and in the co-pending application of Fritch Rausch, U.S. Ser. No. 396,517, filed Sept. 15, 1964 (Docket 25,408), and assigned to the assignee of the present invention. In the apparatus of the Rausch application a Universal Character Set feature is embodied, which permits different type characters to be readily installed having different arrangements and types of numeric and/or alphabetic or other graphic symbols. When a particular type carrier is installed, the codes corresponding to the distinctive graphic symbols employed on said carried must be entered into a character storage unit such that the code entered at each storage position in said unit corresponds sequentially to those of the graphic symbols on the installed type carrier. Each code in the character storage unit is read out in printing position sequence as the various graphic symbols are brought into printing position by movement of the type carrier. A compare circuit matches the codes read out of the storage unit to the codes of the successive graphic symbols of the data record to be printed, which data record had been previously written into a data storage unit in the printer control apparatus. When a particular code read out of the character storage unit and denoting a distinctive graphic symbol (for example A) matches the corresponding ("A") equals the defining code of the data record read out from the data storage unit, an output signal from the compare circuit activates the compare hammer at the approximate printing position to impact the paper against the "A" defining type slug.

The general requirements for character storage in the Universal Character Set feature are as follows:

(1) 240 addressable positions of storage are required;
(2) The storage address must be incremented by 1 or 2
  (a) Increment by 1 when loading storage under program control;
  (b) Increment by 1 with every third subscan drum pulse when not printing or loading;
  (c) Increment by 2 during print scans;
(3) Must have the ability to return to the correct address after each print subscan;
(4) The storage addressing media must be checked for synchronism with the chain/train.

The character storage in the Universal Character Set feature is in fact a replacement for previous binary counters that kept track of the printer chain/train, with the exception that the character storage must have 240 addressable positions as opposed to the 48 discrete character designations that were required with a binary counter approach. The conventional approach to address 240 positions of storage would be to address them sequentially. If this conventoinal approach was followed, one of the two following methods would typically be required to return to the correct address after each print subscan;

(1) Use a side entry register to remember the starting address for a subscan which method is expensive and provides a poor check for synchronism with the printer chain/train.
(2) Use a closed loop addressing ring and add 152 or 154 at the end of print subscans (that is, the ring could advance by 100 once; by ten 5 times and by 1, 2 or 4 times) which makes it expensive to develop the closed loop addressing with the conventional approach and update the addressing in this fashion.

Generally stated, it is an object of this invention to provide a flexible and versatile method of addressing the character storage matrix of a printer having a movable type carrier which carrier may be replaced by others with different type configurations.

More specifically, it is an object of this invention to provide for in essence dividing the addresses of a character storage matrix into four matrix quadrants and to use a pair of triggers in connection with units and tens addressing rings for selectively addressing a particular quadrant and a particular storage position in such quadrant.

One object of the invention is to provide a more economical arrangement for dual addressing of a character storage matrix.

Another object of the invention is to provide apparatus and circuitry for addressing a character storage matrix so as to permit better synchronization checking.

Yet another object of this invention is to provide for addressing a character storage matrix in a high speed printer so as to advance by one address when loading the matrix, by two addresses when making a print scan, and by 1 address for every third subscan pulse when not loading or printing.

It is also an object of this invention to provide for using a closed loop addressing concept with a character storage matrix with a minimum of expense.

Still another object of the invention is to provde for so addressing the character storage matrix in a high speed chain/train printer as to minimize the number of extra advances required at the end of each print subscan to return to the correct address.

According to a preferred embodiment of the invention, a character storage matrix is used to store codes corresponding to the distinctive graphic symbols employed in the particular type carrier used in an "on-the-fly" printer, the codes entered into each storage position corresponding sequentially to those of the successive characters on the installed type carrier. Closed loop addressing of the storage matrix is effected by using an address register which comprises two rings each with an associated trigger. The addresses are considered to be divided into four quadrant groups in which each position is selectively addressed by the rings, while the triggers are used to select the particular quadrant or group in which the address to be selected is located. The addressing may be advanced by 1 for loading and when not loading or printing, and by two when printing, by selectively controlling the operation of the triggers to either alternately or sequentially select Odd or Even addresses.

The foregoing and other objects, features and advantages of the invention will be apparent from the following more detailed description of a preferred embodiment of the invention as illustrated in the accompanying drawings wherein:

FIGS. 1*a* and 1*b* when taken together such that the lower edge of FIG. 1*a* is matched to the upper edge of FIG. 1*b*, constitute a schematic diagram of a printer control apparatus of the type in which the invention is used.

FIGS. 2*a*, 2*b*, and 2*c* when taken together constitute a schematic diagram of the address register and controls used with the system of FIG. 1 (in place of the character storage addressing system shown in FIG. 1) according to the present invention.

Figure 1A:
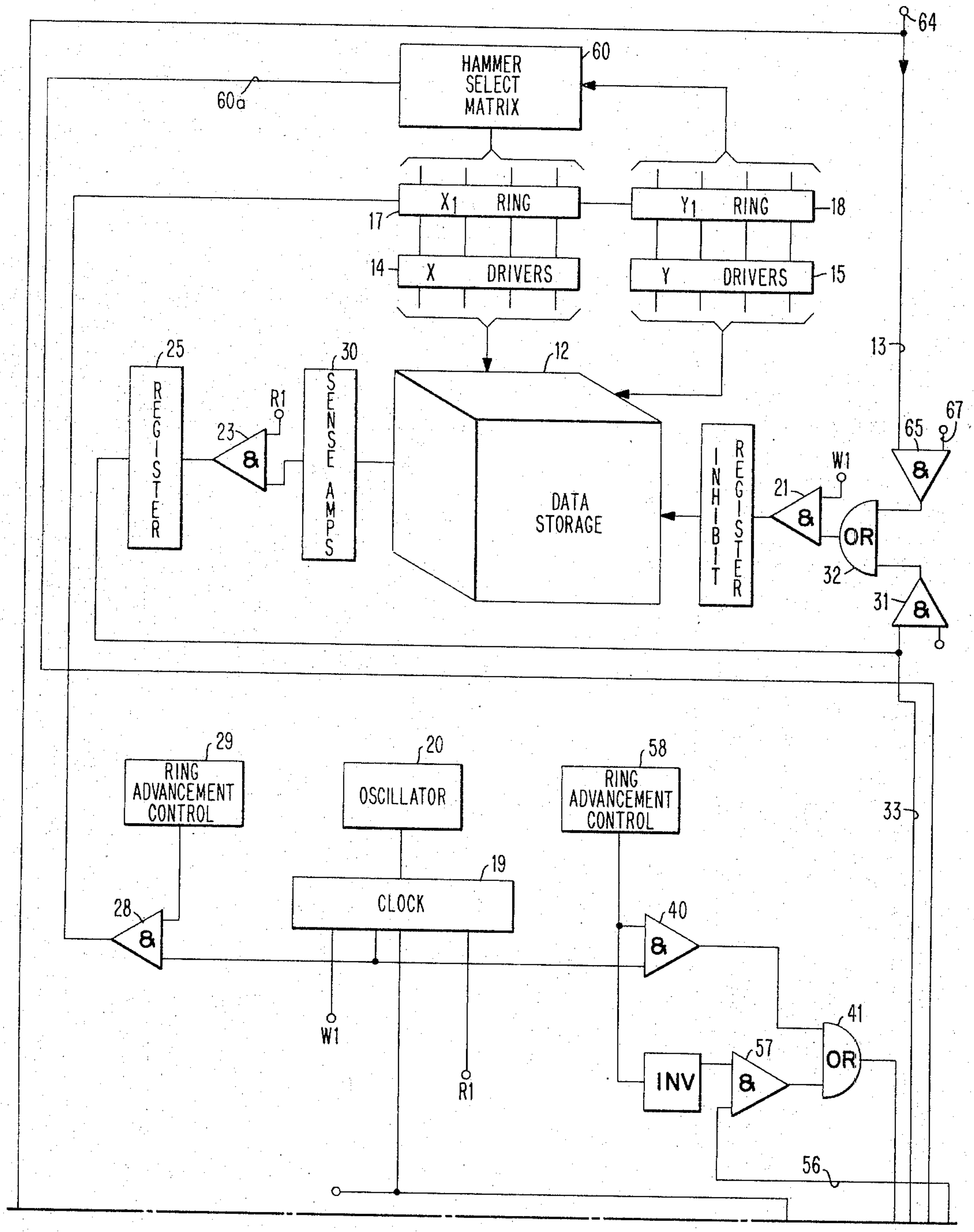
Figure 1B:
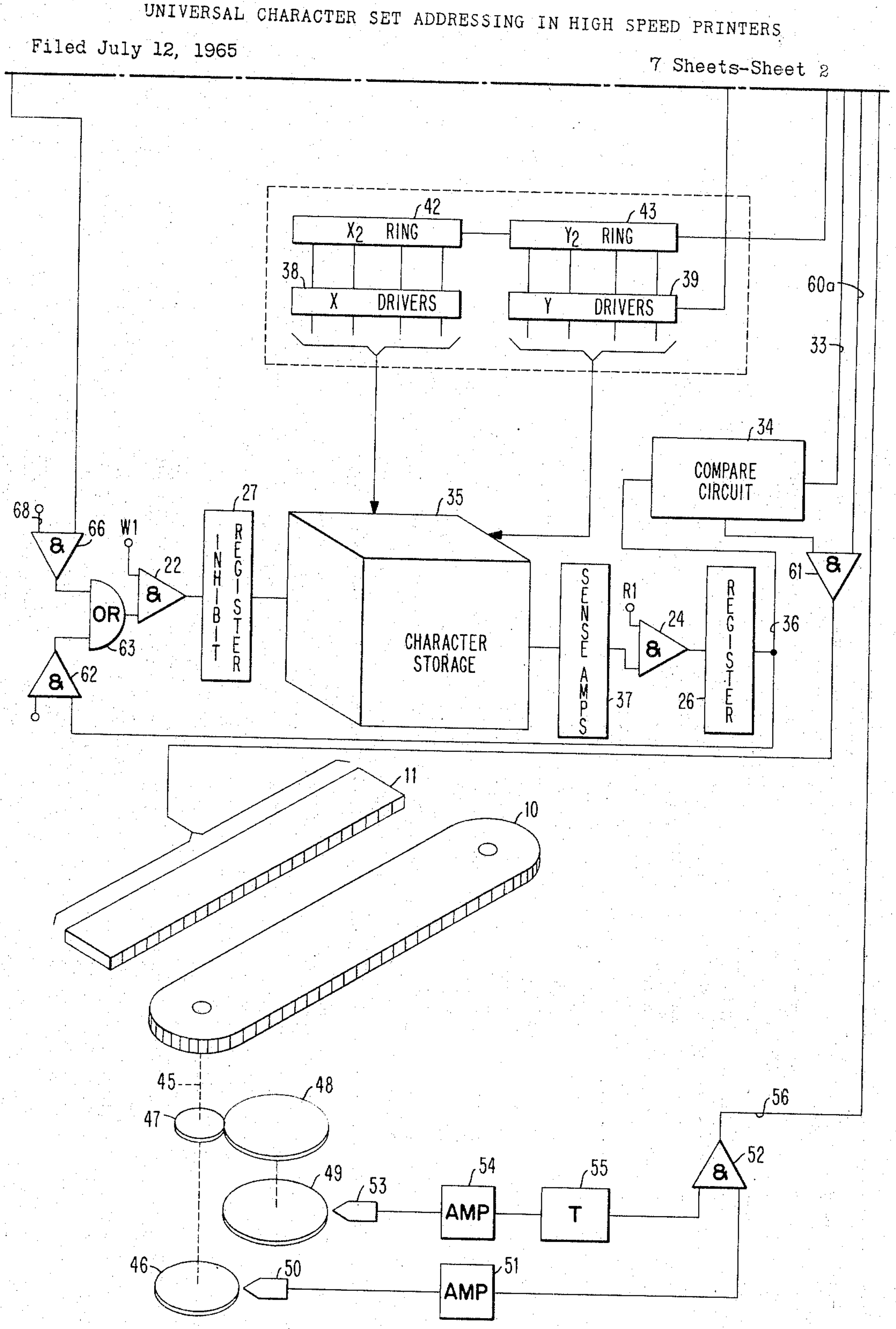

As illustrated in FIGS. 1*a* and 1*b*, the control apparatus shown is substantially identical with that of the copending application of Rausch referred to hereinbefore, and controls operation of a printer comprising an endless type chain/train 10 that moves at a constant speed in a plane that is parallel to the print line and to a bank of hammers 11 (one for each printing position). All of the type characters or symbols to be printed are provided one or more times on the chain 10. As a paper web (not shown) is advanced intermittently upward between the chain and bank of hammers, the particular hammer then at a printing position will be actuated to drive the paper into contact with the proper type slug on the chain when the character on said slug is determined to correspond to that of the data to be printed, in a manner presently to be described.

The codes representing the characters of a line of data to be printed are written into the individual positions of a data storage unit 12 under the control of X drivers 14, Y drivers 15, and a write inhibit register 16 according to their intended arrangement in the line to be printed. The X drivers 14 and the Y drivers 15 are controlled by an X1 address ring 17 and a Y1 address ring 18, respectively, which in turn are advanced step-by-step by clock pulses provided by a clock generator 19 driven from a continuously oscillating oscillator 20. A clock pulse is supplied at "write time" to a line W1 that is connected in parallel to AND gates 21 and 22 to insure that read in of coded information to inhibit registers 16 and 27 occurs at the proper time; and, similarly, a clock pulse is supplied at "read time" to a line R1 that is connected in parallel to AND gates 23 and 24 to insure that read-in of coded information into the registers 25 and 26 occurs at the proper time. A pulse is delivered to the X1 address ring 17 and the Y1 address ring 18 via an AND gate 28 when a clock pulse is supplied from clock 19 while the output of a ring advance control circuit 29 is conditioned. An output is provided from circuit 29 only when data is read into or out of the data storage unit 12 for printing purposes.

The data storage unit 12 is a core matrix array with 9 planes to provide eight data bits and one parity bit. The contents of each storage position of storage unit 12 are read out via sense amplifiers 30 into the register 25 by half-select coincident currents supplied from the drivers 14 and 15 to the X and Y drive lines defining the said storage position. Data from register 25 is rewritten into the same storage position of unit 12 via an AND gate 31 and an OR gate 32 upon reverse flow of half-select coincident currents through the appropriate X and Y drive lines and energization of selected ones of the inhibit drivers 16 in accordance with conventional practice.

Meanwhile, the coded contents of the last-mentioned storage position are simultaneously read out from register 25 through bus 33 to a compare circuit 34. This circuit 34 matches the codes read out of the data storage unit 12 against the codes representing the successive graphic symbols on the type chain 10 with which the character storage unit has been previously loaded. As above indicated, these codes should preferably be entered into the character storage unit so as to correspond exactly in code designation and sequence with the code designation and sequence of successive symbols on the chain. The coded information from the character storage unit 35 is read out via sense amplifier 37 and AND gate 24 into register 26 and thence via a bus 36 to compare circuit 34.

The character storage unit 35 comprises nine planes of cores providing an eight-bit character and a parity bit at each of the 240 storage positions corresponding to the 240 characters on the chain 10. The codes representing the successive graphic symbols on the type chain 10 are written into the successive storage positions in character storage unit 35 under the control of X drivers 38, Y drivers 39, and a write inhibit register 27 in accordance with their sequential arrangement in the type chain 10. The X drivers 38 and Y drivers 39 are controlled by clock pulses from generator 19 through an AND gate 40, and OR gate 41 and the X2 and Y2 address rings 42 and 43, respectively. The X2 and Y2 address rings 42 and 43 are advanced in synchronism with the movement of type chain 10 in the following manner.

The drive mechanism for the chain 10 is connected via a shaft 45 to a magnetic track disk 46 and also via gears 47 and 48 to a magnetic track disk 49 secured to the same shaft as gear 48. The ratio of gears 47 and 48 is selected to cause disk 49 to rotate once for each revolution of the chain. Each time a type character on chain 10 is in printing position, a pulse is generated by magnetic indicia on the magnetic disk 46 and transmitted via a magnetic head 50 and amplifier 51 to an AND gate 52. Magnetic track disk 49 has a single magnetic mark which is so located as to transmit a pulse via a magnetic head 53 and amplifier 54 to set a trigger 55 on when the chain occupies a predetermined position; viz., when that type character or symbol corresponding to the character at storage address "1" and storage unit 35 is opposite the first print hammer 11. This is so that advancement of the X2 and Y2 address rings 42 and 43 can start at the proper time and remain synchronized with the movement of the type chain throughout a complete revolution. With trigger 55 ON, pulses picked up by the magnetic head 50 can pass through AND gate 52 to a line 56.

To perform a printing operation, advancement of the X2 and Y2 address rings 42 and 43 is effected in either of two ways; first, by a clock pulse supplied from generator 19 while the output of ring advancement control circuit 58 is conditioned and satisfies AND gate 40 to supply a pulse to rings 42 and 43 via OR gate 41; and secondly, by a pulse transmitted via line 56 to an AND gate 57 and the OR gate 41, provided the ring advancement control circuit 58 is not conditioned. Hence, assuming that the type chain carries 240 characters and that the character storage unit 35 has a corresponding number of 240 storage positions or addresses, each advancement of the type chain one character width will result in 240 advance pulses being supplied from the clock pulse generator 19 via gates 40 and 41 to the X2 and Y2 address rings 42 and 43; and a single advance pulse will be supplied via AND gate 52, line 56, AND gate 57 and OR gate 41 to set X2 and Y2 address rings. Since the clock pulse generator 19 controls the X1 and Y1 address rings 17 and 18, and also controls the X2 and Y2 address rings 42 and 43, read out of the two storage units 12 and 35 will be effected simultaneously; however, after each complete read out of storage unit 12 the read out of storage unit 35 will start with a 1 position shift caused by the pulse supplied from disk 46 via AND gate 52.

Note that the X1 and Y1 address rings 17 and 18 are so connected to a hammer selection matrix 60 that the preselected number of print hammers 11 is conditioned for successive actuation through a bus **60*a* and a corresponding number of AND gates 61 in synchronism with the read out of the storage positions in data storage unit 12. However, a particular print hammer will be actuated only if a pulse is supplied to the corresponding AND switch 61 signifying that the compare circuit 34 has detected the presence of identical character codes in the registers 25 and 26**.

Regeneration of the coded information in each of the storage positions of storage unit 35 is effected in a manner similar to that used to regenerate coded data in storage unit 12. Previously, the coded information read out from the register 26 into the compare circuit 34 is also written back into the same storage position via AND gate 62, OR gate 63, AND gate 22 and inhibit register 27 when a pulse is supplied to line W1 at "write time."

A special advantage of the arrangement hereinbefore described resides in the fact that it is possible in the performance of different operations, the optimal performance of which requires the provision of different characters or different character distributions or different frequencies of occurrence of characters on the type chain 10, to place the respectively appropriate chain into the machine, the image of which is then entered in a very simple manner into the storage unit 35.

The image of the type characters on the type carrier 10 is entered into the core storage unit 35 in accordance with their arrangement on the carrier in a manner analogous to the entry of data into the storage unit 12, under the control of the X2 and Y2 address rings 42 and 43, as well as the X write drivers 38 and Y write drivers 39. Normally the storage of the image of the type characters takes place only once prior to the start of a printing operation. It may, however, if desired, be changed between successive printing operations.

Figure 2A:
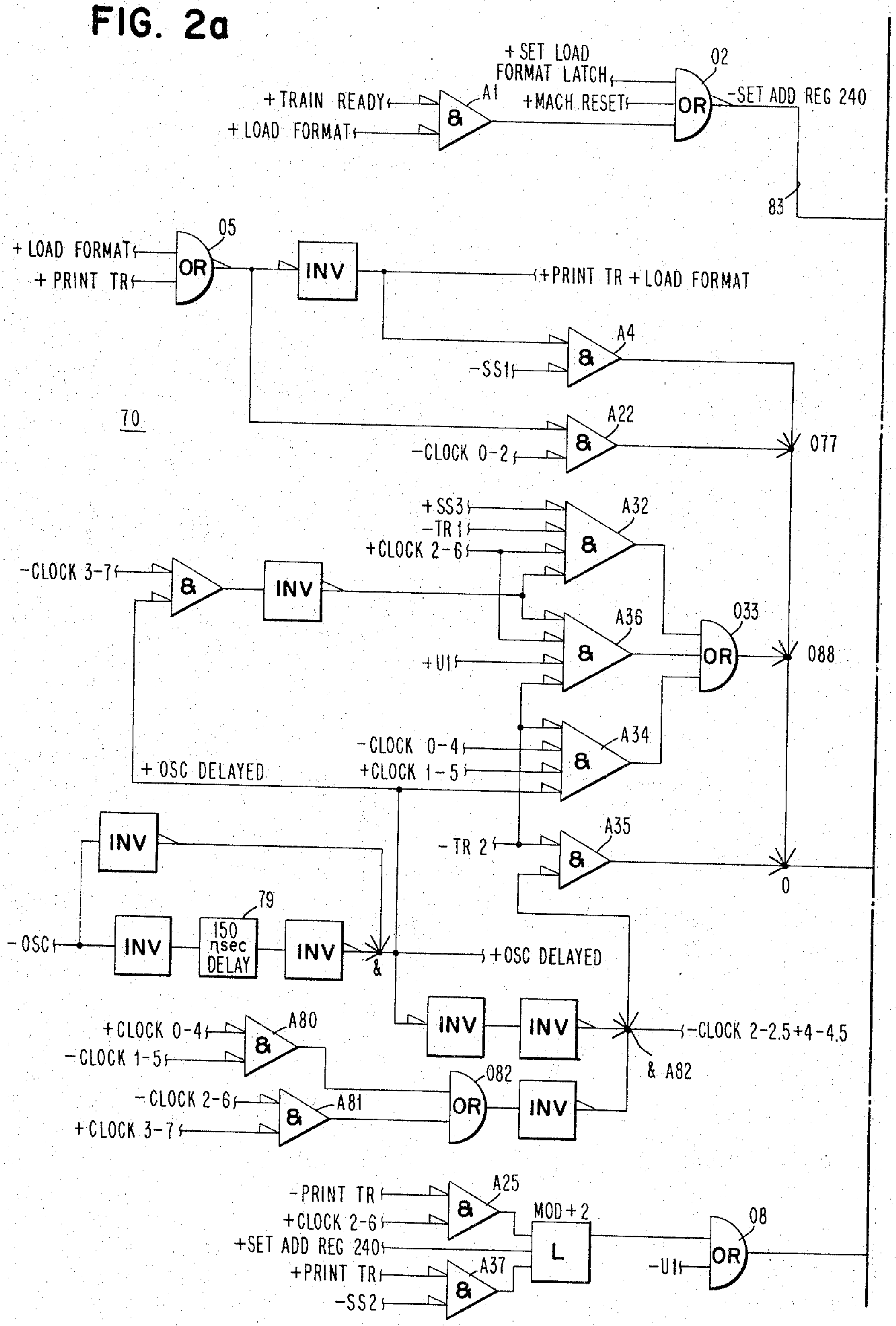
Figure 2B:
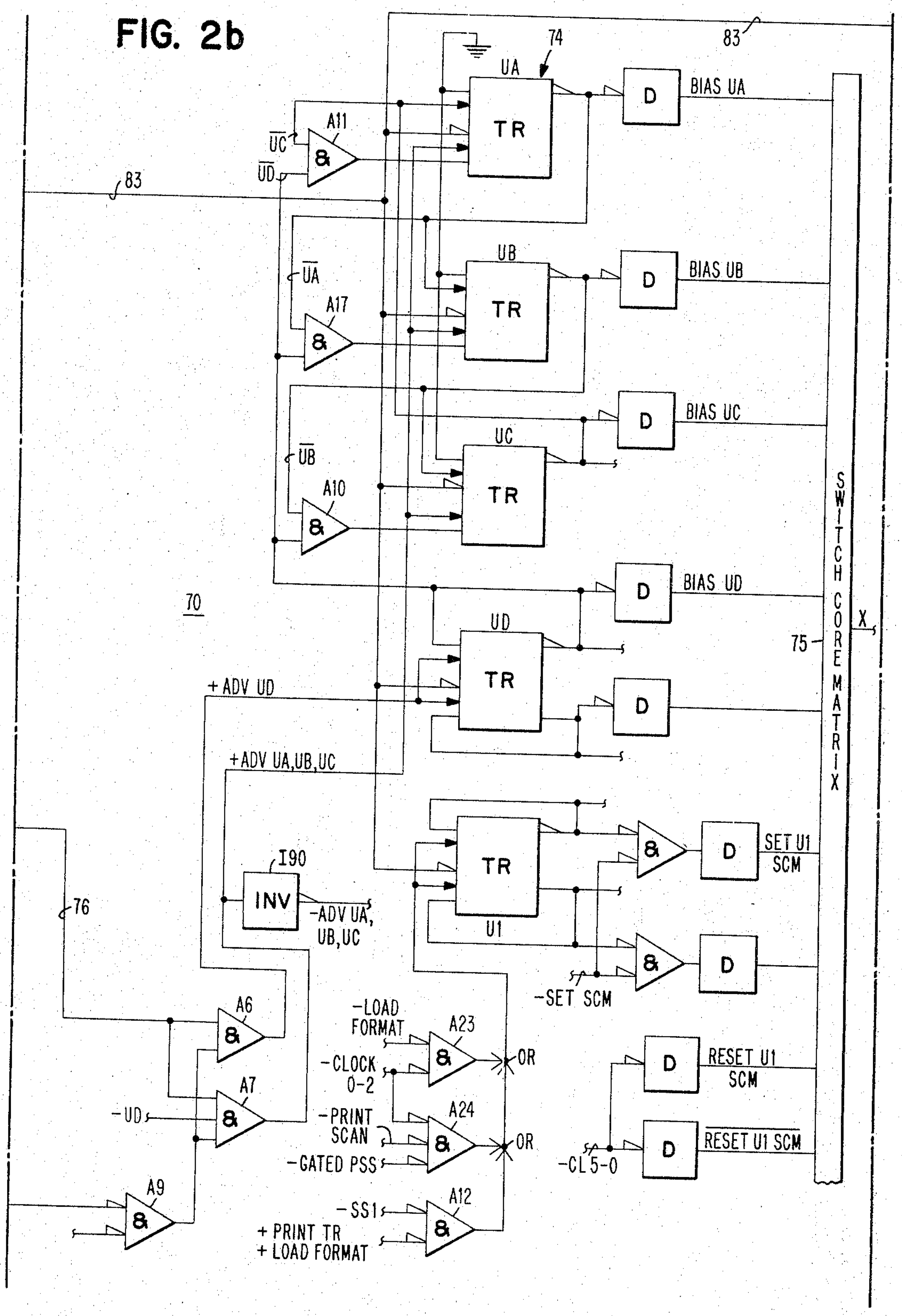
Figure 2C:
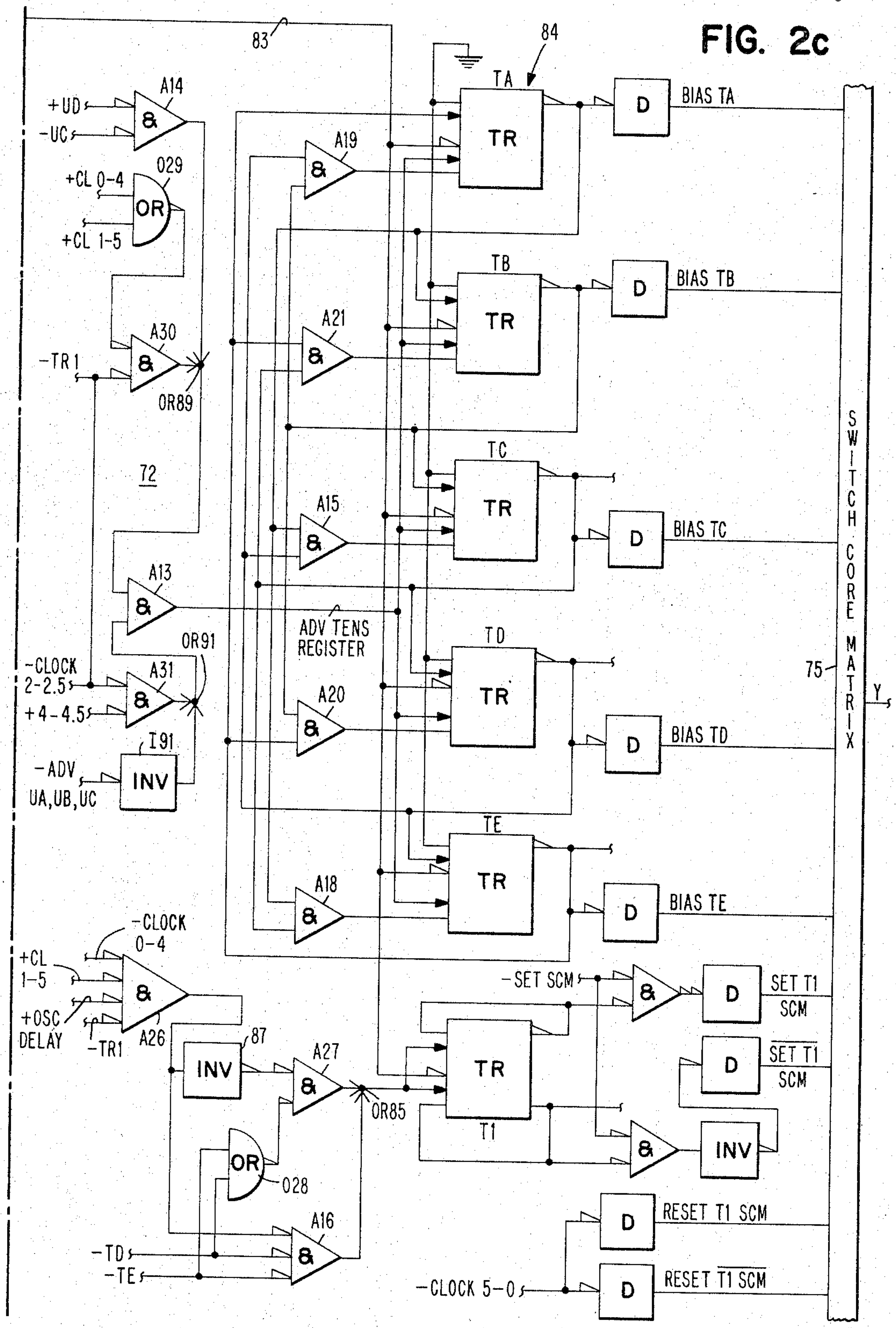

Referring to FIGS. 2*a*, 2*b*, and 2*c* it will be seen that the X2 ring 42, and X drivers 38, have been replaced by the X drive circuitry 70 of FIGS. 2*a*–2*b*, and the Y2 ring 43 and Y drivers 39 have been replaced by the Y drive circuitry 72 of the FIG. 2*c*.

Figure 5:
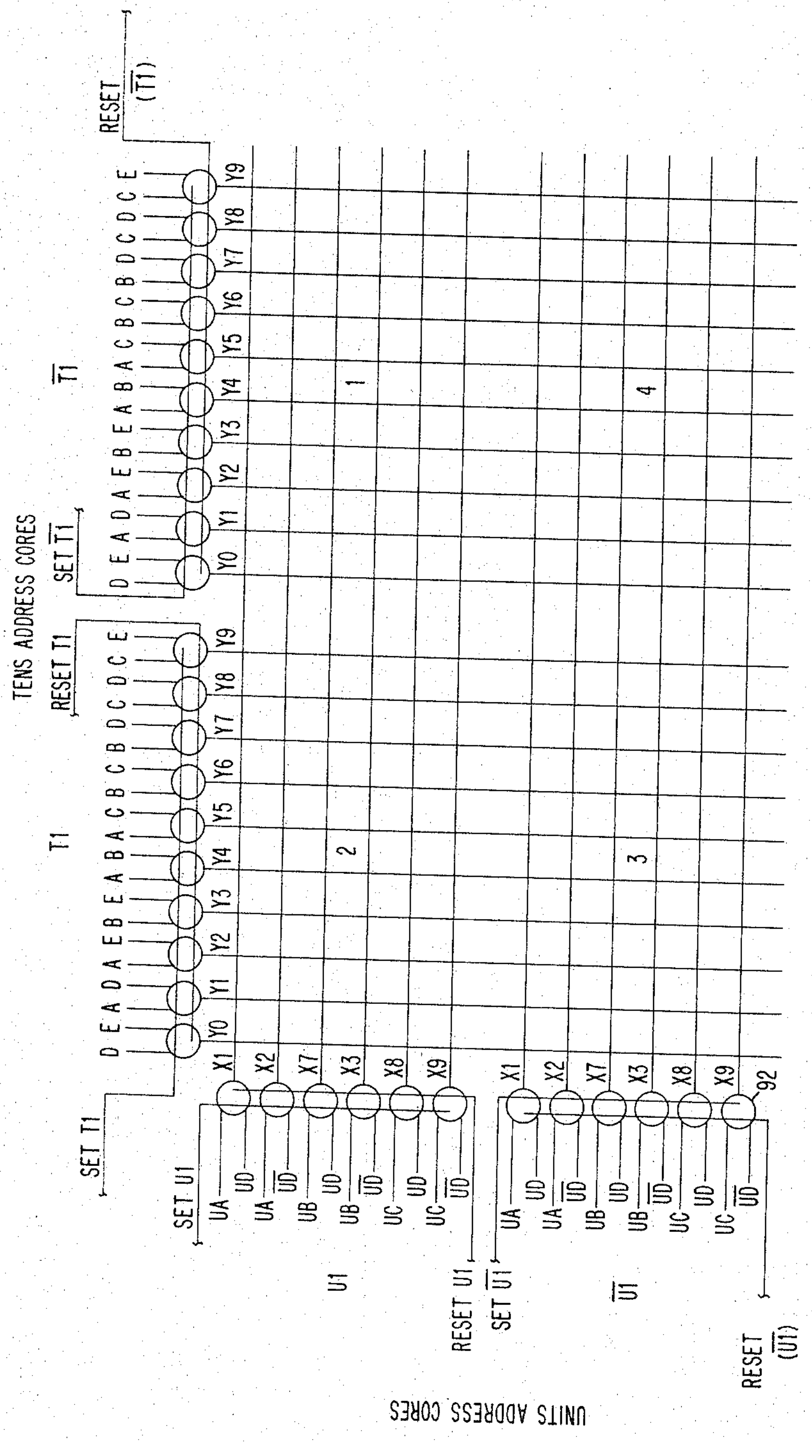
FIG. 5 is a schematic showing of a portion of the switching cores for a typical core plane of the character storage matrix, showing the relations of the various lines used in addressing.

Referring particularly to FIGS. 2*a* and 2*b*, together with FIG. 5, it will be seen that units buffer address register 74 comprises four triggers UA, UB, UC, and UD which are connected to provide a two-out-of-five drive for a switch core matrix 75 providing the X drive over lines X, while a units 1 trigger U1 is connected to the switch core matrix to provide the quadrant selection for the X drive.

Operation of the units 1 trigger U1 is controlled by three AND gates A23, A24, A12 which control the operation during the different modes of advance which are, respectively, when loading, when printing and when neither printing nor loading.

Operation of the units register 74 is controlled through a pair of AND circuits A6 and A7. One input of each of these AND circuits is derived from an AND circuit A9 which in turn is controlled by an OR circuit O8 in response to the output of a MOD+2 latch which is turned on by an AND circuit A25 and switched off by an AND circuit A37. Another input to each of the AND circuits A6 and A7 is derived from conductor 76 to which signals are applied from an OR circuit O5 which responds to +Load Format or +Print TR which comes from the printer controls at the start of a print cycle, either through an AND circuit A4 or an AND circuit A22 depending upon the existence or not of an SS1 subscan pulse from a control such as the subscan counter GR of Demer et al. or a clock 0–2 signal which will be dot OR'd at O77, and again at O78 with a signal from an AND circuit A32, A36, or A34 through an OR O33. Another signal applied to the conductor 76 comes from AND A35 in response to −TR2 and the absence of a delayed oscillator pulse from delay 79 anded at A82 with the inverted output from one or the other of ANDS A80, A81 through OR O82.

Reset of the units register 74 is effected from the output of an AND A1 through an OR O2 and conductor 83 in response to the absence of Train Ready, Load Format from the controls, or Set Load Format Latch signal from a central processing unit.

Referring to FIG. 2*c* it will be seen that a tens buffer address register 84 of buffer address register 73 comprises five triggers TA, TB, TC, TD, and TE, the outputs of which are connected to the switch core matrix 75 to provide a two-out-of-five drive for operating the Y drive lines Y. In the same manner as described in connection with FIGS. 2*a*, 2*b*, a tens trigger T1 is also connected to the switch core matrix 75 for selecting with the units trigger U1, the quadrant in which the selected address is located.

The trigger T1 is controlled by a pair of AND gates A27, A16 which are dot OR'd at O85 to provide the AC on and off set for the trigger. The on outputs of the trigger TD and the trigger TE provide two of the inputs to the AND gate A16 and are also connected through an OR O28 to provide one input to the AND gate A27. An AND gate A26 provides the third input to A16, and provides through an inverter 87, the second input to A27.

Operation of the tens register 84 is effected through AND gate A13, which has one input provided by AND gate A14 and AND gate A30 which is dot OR'd at O89, the one input to the AND gate A30 being provided by OR O29. The other input to AND gate A13 is provided by AND gate A31 and inverter 90 which are dot OR'd at O91. A second input to A30 is provided by signal −TR1 which is one of two signals shown in FIG. 3 (TR1–TR2) generated by the printer control to provide two extra clock cycles at the end of a print scan for updating the address register.

Figures 3, 4:
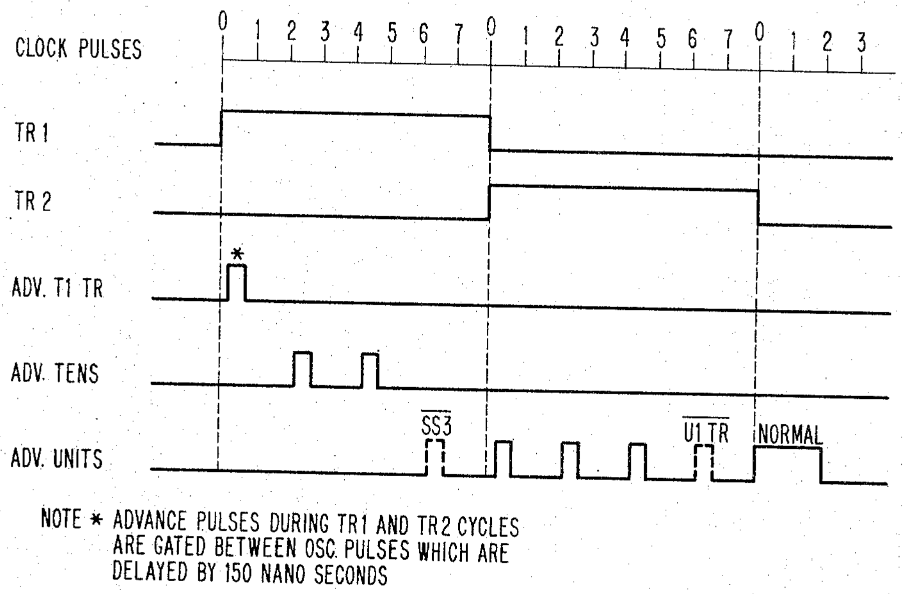
FIG. 3 is a timing chart showing the relative timing of clock and trigger pulses during an address update operation.
FIG. 4 is a chart showing the relationship of the units and tens triggers to the character storage quadrants.
Figure 6:
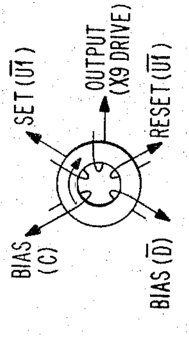
FIG. 6 is a schematic showing of the selected X switching core in FIG. 5 indicating the relative directions of the currents in the various lines.

Referring to FIG. 4, it will be seen that the triggers U1 and T1 are utilized to select, in effect, in which of the first, second, third, or fourth quadrant the particular address being selected lies. Referring in connection with FIG. 4 to FIG. 5, it will be seen that different combinations of the units triggers UA, UB, UC, UD are utilized in connection with the units trigger U1 to select a single X drive line such as X9, from one of the two groups which thread cores in quadrants 1–2 and 3–4 respectively. In a like manner, triggers TA through TE and tens trigger T1 are utilized to select the particular Y drive line. The directions of the X select windings on a typical switch core 92 for selecting X drive line X9 are shown in FIG. 6. UC being on, its ON output is negative and its driver supplies no current to the Bias C winding. UD being off, its off output is negative and the corresponding driver provides no current to the Bias $\overline{D}$ winding. The Set $\overline{U1}$ output driver sets the core 92.

*Operation of the buffer address register when not printing or loading*

The buffer address register 27 is set and held at address 240 when the signals "train ready" and "load format" are not present by AND gate A1 and OR O2. This condition turns the tens triggers TC, TE, and the units trigger UC on. The remaining triggers in the address register are reset off. When the chain/train 10 reaches its home position "train ready" turns on and removes the above "set to address 240" condition. This allows the address register to advance one position with every subscan "SS1" pulse when the "Print TR" or "Load Format" conditions are not present. The first advance is accomplished in the following manner. "SS1" ands at A4 with the Not condition of "Print Tr" or "Load Format" developed by O5. The output of A4 samples leg #1 of both A6 and A7. The "MOD+2" latch was previously reset by the inverted output of O2 and will remain off until the print operation is performed.

Since the "MOD+2" latch is off, leg #1 of O8 is not conditioned. When the units trigger signal "—U1" is not present, leg #2 of O8 will be conditioned. The output of O8 conditions A9, which in turn conditions leg #2 of A6 and leg #3 of A7. Leg #2 of A9 may be ignored because it is only conditioned during a customer engineer operation. Since the units trigger UD was reset off by O2, leg #2 of A7 is conditioned. This conditions all legs of A7 so that the output of A7 applies an advance pulse to the AC off inputs of the units triggers UA, UB and UC. The units triggers UB and UD being off, condition A10 which brings up the "Off" gate to the units trigger UC. Therefore, when the advance pulse comes, the units trigger UC will turn off. Since the negative output of the trigger UC goes to the AC on input of the units trigger UA and deconditions the off gate through A11, the units trigger UA will turn on when the units trigger UC turns off.

The inputs to A6 were conditioned at the same time as those of A7, so that the output of A6 applies an advance pulse to the units trigger UD. Since the trigger UD is self-gated, it changes state every time an advance pulse is received and will consequently turn on at this time. The inputs to A12 were conditioned with the SS1 pulse and NOT Print trigger or Load Format, similar to A4, so that the output of A12 applies an advance pulse to the units 1 trigger U1. Since the trigger U1 is self-gated, it also changes state with every advance pulse and therefore turns on at this time.

The advance pulse to the units triggers UA, UB, and UC goes through two isolation inverters I90 and I91 to a DOT OR O91 and leg #2 of A13. The units trigger UD being off and the units trigger UC being on, conditions A14 which goes to a DOT OR O89 to condition leg #1 of A13. This satisfies A13 whose output pulse applies an advance pulse to the AC OFF inputs of the tens triggers TA, TB, TC, TD and TE. The tens triggers TA and TD being off, condition A15 whose output conditions the tens trigger TC OFF gate. Therefore, the advance pulse turns trigger TC off, which in turn sets the tens trigger TD by way of the AC ON input.

This conditions A16 since the trigger TE is on to condition leg #2, and leg #1 is only deconditioned during an update cycle near the end of a print scan. The output of A16 goes to a DOT OR O85 and applies an advance pulse to the tens trigger T1. Since T1 is self-gated and changes state for every advance pulse, it will turn on at this time.

The address register has now advanced from the address representing the 240th graphic on the chain/train 10 to the address representing the first graphic. The following triggers in the address register are now on to represent the address of the first graphic:

TD, TE, T1, UA, UD, U1

The next SS1 pulse will not get through A6 or A7 since leg #2 of A6 and leg #3 of A7 are not conditioned. All other legs on A6 and A7 must be up prior to leg #1 in order to get an output. Trigger U1 being on deconditions O8, whose output deconditions A6 and A7 through A9. Therefore, no advance pulse will be applied to the units triggers UA, UB, UC, or UD at this time. The SS1 pulse will apply an advance pulse to the units trigger U1 through A12 which will turn it off. Since no advance pulse was applied to triggers UA, UB, or UC, A13 will not be conditioned and the tens triggers will not change state. The address register has now advanced to the address of the second graphic with the only change being that the units trigger U1 has turned off.

The next SS1 pulse will apply an advance pulse through A4 and A6 to turn the units trigger UD off, and through A12 to turn the units trigger U1 on. The units trigger UD being on, deconditions leg #2 of A7, so that no advance pulse is applied to the units triggers UA, UB, or UC. Since leg #1 and leg #2 of A13 are not conditioned, no advance pulse will be applied to the tens triggers. The following triggers in the address register are now on to represent the third graphic on the chain/train:

TD, TE, T1, UA, U1

Since the trigger U1 deconditions A6 and A7 through O8, no advance pulse will be applied to the units triggers UA, UB, UC, or UD by the next SS1 pulse. A13 will not be conditioned, so consequently the tens triggers will not advance. A12 will be conditioned with this SS1 pulse and the output of A12 will turn trigger U1 off. The address register now represents the address of the fourth graphic on the chain/train.

The trigger U1 being off, conditions leg #2 of A6 and leg #3 of A7 through O8 and A9. Trigger UD being off conditions leg #2 of A7 so that the next SS1 pulse through A4 samples A7, which in turn applies an advance pulse to the AC OFF input of the units triggers UA, UB, and UC. Since the triggers UD and UC are off, A11 conditions the units trigger UA to turn off. Trigger UA turning off sets trigger UB by way of the AC set. The units trigger UA being on blocks any attempt to AC reset a trigger UB by deconditioning A17. Since A6 is also conditioned, an advance pulse will be applied to trigger UD which turns it on. Trigger UC being off prevents conditioning A13 at this time, so that no advance pulse is applied to the tens triggers. A12 being conditioned by the SS1 pulse applies an advance pulse to the units trigger U1 which turns it on. The address register now represents the 5th graphic on the chain/train. Trigger U1 being on prevents applying advance pulses to any triggers except itself, so consequently the next SS1 pulse only turns the units 1 trigger off, thereby advancing the register to represent the 6th graphic.

Since trigger UD is on, A7 will not be conditioned, which prevents applying an advance pulse to the units triggers UA, UB, or UC and to any of the tens triggers. With trigger U1 off the next SS1 pulse conidtions A6 which turns trigger UD off. Trigger U1 is now turned on by A12 and the address register now represents the 7th graphic. Since the trigger U1 is on, it prevents applying advance pulses to any triggers other than itself, and the next SS1 pulse will only turn trigger U1 off. The address register now represents the 8th graphic at this time.

Triggers UD and U1 both being off, condition A6 and A7 so that the next SS1 pulse applies an advance pulse to the units triggers UA, UB, UC, and UD. Since triggers UA and UD are off, A17 is conditioned to gate the trigger UB off. The units advance pulse will therefore turn trigger UB off, which in turn sets trigger UC by way of its AC set. Triggers U1 and UD being self-gated, turn on at this time. The address register now represents the 9th graphic on the chain/train. Trigger U1 being on again blocks advance pulses except to itself, so that the next SS1 pulse only turns trigger U1 off. The 10th graphic is now represented by the condition of the addresss register.

Trigger UD being on deconditions A7 thereby preventing the next advance pulse from being applied to the units triggers UA, UB, UC or any of the tens triggers. Trigger U1 being off conditions A6 such that the next SS1 pulse advances the units trigger UD turning it off. A12 is again conditioned by the SS1 pulse and its output applies an advance pulse to the units trigger U1 which turns it on. The address register now represents the position of the 11th graphic on the chain/train. Since the units trigger U1 is now on, the next SS1 pulse will only turn the trigger U1 off. At this time the address register has the following triggers on to represent the position of the 12th graphic:

TD, TE, T1, UC

Since triggers U1 and UD are off, A6 and A7 will be conditioned. The next SS1 pulse will sample A6 and A7 so that an advance pulse will be applied to the units triggers UA, UB, UC, and UD. The units triggers UB and UD being off condition A10, so that the advance pulse turns the trigger UC off. Trigger UC going off sets trigger UA on by way of the AC set. The units triggers U1 and UD being self-gated, turned on by way of A12 and A7, respectively. Trigger UC being on and trigger UD being off, condition A14. A14 in turn conditions leg #1 of A13 so that when the units ABC trigger advance samples leg #2 of A13, an advance pulse is applied to the tens triggers through A13. The tens triggers TA and TC being off condition A18 which gates the trigger TE to turn it off. With the tens advance pulse, the tens trigger TE will turn off, which in turn AC sets the tens trigger TA on. Trigger TD being on prevents a simultaneous attempt to AC reset the units trigger UA by deconditioning A19. Since the tens trigger T1 will not be advanced until A16 is satisfied, and A16 will not be satisfied until the tens triggers TD and TE are on simultaneously, the trigger T1 will remain on.

The following triggers are now on in the address register to represent the 13th graphic:

TA, TD, T1, UA, UD, U1

The units triggers will advance in a similar manner until the trigger UC is on and the triggers UD and U1 are off again. At this time an SS1 pulse will cause another advance pulse to be applied to the tens triggers to A4, A7 and A13. The tens triggers TB and TE being off conditions A20 so that the advance pulse turns TD off. Trigger TD going off AC sets the tens trigger TE on. Trigger TA being on prevents attempting to AC reset the tens trigger TE at this time. The address register now represents the position on the 25th graphic on the chain/train.

Since an advance pulse will be applied to the tens triggers with every SS1 pulse when the units trigger UC is on and the units triggers U1 and UD are off, the remainder of this operation will be concerned with the advancing of the tens triggers only. The tens triggers TB, TD being off condition A19 so that the next advance pulse through A13 turns trigger TA off. Trigger TA turning off AC sets trigger TB on. Trigger TE being on deconditions A21 thereby preventing simultaneous attempts to AC reset the trigger TB. At this point the address register represents the 37th graphic on the chain/train.

Since the triggers TA and TC are off, A18 will be conditioned to gate the trigger TE off. After the units triggers have gone through 12 addresses, A13 will again be satisfied and apply an advance pulse to the tens triggers which turn trigger TE off. Trigger TA will be turned on through the AC set by trigger TE turning off. The address register now represents the 49th graphic. The tens triggers TC and TE being off condition A21 to gate the trigger TB off, so that the next tens advance pulse will reset it off. The trigger TB turning off AC sets the trigger TC on. Trigger TA being on prevents attempting to AC reset trigger TB by deconditioning A15. The address register now represents the position of the 61st graphic.

The tens triggers TB and TD being off condition A19 which gates the trigger TA off, so that the next tens advance pulse turns the trigger TA off. Trigger TA turning off AC sets trigger TB on. Trigger TC being on deconditions A21, thus preventing an attempt to AC reset the trigger TB at this time. The address register now represents the 73rd graphic. The tens triggers will continue advancing in a similar manner with the off gate conditioned for the trigger to be reset, and the off gate deconditioned for the next trigger in sequence to be turned on, thus preventing a simultaneous set-reset condition. Trigger TD turning on in conjunction with TE being on satisfies A16, thus applying an advance pulse to trigger T1. Since trigger T1 is on and is self-gated, it will turn off at this time.

The following triggers in the address register would now be on to represent the positions of the 121st graphic:

TD, TE, UA, UD, U1

The tens triggers continue to advance once for every 12 advance pulses applied to the units trigger, exactly the same as when the tens trigger T1 was on. After 120 advance pulses to the unit triggers (10 advance pulses to the tens triggers) triggers TD and TE again satisfy A16, applying an advance pulse to the tens trigger T1. Being self-gated, trigger T1 turns on at this time.

The following triggers are on at this time to represent the position of the 1st graphic on the chain/train:

TD, TE, T1, UA, UD, U1

The address register has now incremented through one complete set of addresses corresponding to the 240 graphics passing hammer position 1 during one revolution of the chain/train. The address register will advance in this manner as long as a Print or Load Format operation is not being performed.

*Operation of the address register during a load format*

Advancing of the address register during a Load Format operation is essentially the same as when not printing or loading with the following exceptions:

(1) Load Format conditions O5 which deconditions A4 and A12, thus preventing SS1 pulse from advancing the address register.

(2) The output of O5 conditions A22 and A23.

(3) Clock 0–2 pulses will satisfy A22 and A23, causing an advance pulse to be applied to the address register which increments it in a manner similar to the way in which the SSI pulse did.

(4) At the beginning of the Load Format operation the address register is set to address 240 by leg #3 of O2.

(5) The address register will advance one address for every clock cycle until address 240 is again reached. The Load Format operation will be terminated at this time and the address register will be synchronized with the chain/train by bringing up Train Ready with the next home pulse and allowing SS1 pulses to again apply advance pulses.

*Operation of the address register during a print operation*

During the time between print operations, the address register is advancing such that it represents the position of the graphic that is located in front of or just passed the first print position. When the print trigger turns on O5 is satisfied, which prevents SS1 pulse advances by blocking A4 and A12. O5 also conditions A22 such that "Clock 0–2" pulses will satisfy A22.

It should be noted at this time that the "Clock 0–2" pulses used for advancing the address register are gated with Print Scan or Load Format. Consequently, they will not be present during "TR1" or "TR2" update cycles. The output of A22 samples leg #1 of both A6 and A7. This being the first cycle of a print scan, the address register will advance one address similar to the way it did during the Load Format operation. A24 instead of A23 will be used to advance the units trigger U1. A24 will be satisfied on the first cycle of every Print Scan since gated PSS signal will only be present during the early half of the first cycle.

When Trigger C+Clock 2–6 comes up A25 will be satisfied thereby turning the "MOD+2" latch on. This latch being on satisfies leg #1 of O8 so that leg #2 of A6 and leg #3 of A7 will be conditioned through A9 at all times, regardless of the status of the units trigger U1. This means that the units triggers UA, UB, UC, and UD will be advanced every clock cycle during a Print Scan, and the units trigger U1 will be advanced only once per Print Scan. The result is that the address register will advance two addresses for every clock cycle, after the "MOD+2" latch turns on, except on the first cycle of each Print Scan when it advances 1 or 3 addresses, depending on whether the units U1 trigger turns on or off, respectively. During the 44 cycles of a Print Scan, if the trigger U1 turns on, the address register will advance 87 addresses. This means that if the address register were setting at address 240 just prior to a print scan, it would be at address 87 during the last cycle of a print scan. If this Print Scan occurred during SS1 time, then the first cycle of the next Print Scan must advance the address register to address 2.

Since the units trigger U1 is on, and will consequently be turned off, the address register will effectively be advancing 3 addresses on the first cycle of the print scan. Therefore, the address register must be advanced to address 239 prior to the next print scan. In order to get from address 87 to address 239, two clock cycles will be taken between print scans. The first cycle will be during "TR1" time and the second cycle during "TR2" time. The curves showing the relationship of "TR1" and "TR2" relative to the clock cycles are shown in FIG. 3.

A26 will be satisfied every "TR1" cycle between delayed oscillator pulses during Clock 0–1 time. The inverted output of A26 will condition leg #1 of A27. Either the tens triggers TD or TE being off will satisfy O28, which in turn satisfies A27. The output of A27 applies an advance pulse to the tens trigger T1, which advances the address register by 120 addresses.

If both the tens triggers TD and TE are on, then legs #2 and #3 of A16 would be conditioned. When A26 is satisfied, leg #1 of A16 will be deconditioned. The output of A16 will then go negative and stay negative until the "+OSC Pulse Delayed" signal deconditions A26, thereby satisfying A16 again. Satisfying A16 causes its output to go positive. Since a positive shift on the AC input to the tens trigger T1 will advance it, trigger T1 turns off. This provides the same advance of 120 addresses that A27 provided, only delayed by half of an oscillator cycle. In both cases the address register will be setting at address 207 at the end of Clock 0–1 time of the TR1 cycle.

During this TR1 cycle A30 will be satisfied during Clock 0–5 time by way of O29. The output of A30 conditions leg #1 of A13. TR1 also conditions leg #1 of A31. Leg #2 or A31 will be conditioned by clock 2–2.5+4–4.5 thereby satisfying A31 whose output samples A13. A13 being satisfied at 2–2.5 time and at 4–4.5 time applies two advance pulses to the tens triggers resulting in an advance of 24 addresses. The address register now sets at address 231. A32 will be satisfied on TR1 cycles, other than those on subscan 3, during Clock 6–7 time between delayed oscillator pulses. The output of A32 satisfies O33 which samples A6 and A7, resulting in an advance pulse being applied to the units triggers UA, UB, UC, and UD. The address register will advance two addresses and in this example will advance to address 233. On TR1 cycles occurring on a subscan 3, the units triggers UA, UB, UC, and UD will not be advanced, resulting in the address register being two addresses behind those on the other subscans. This is required because the starting address at the beginning of a print scan on a subscan 1 must be one address behind the previous starting address of the previous print scan, instead of one address ahead as on a subscan 2 or 3. On TR2 cycles A34 will be satisfied during Clock 0–1 time between delayed oscillator pulses. A34 satisfies O33 whose output samples leg #1 of A6 and A7, thereby applying an advance pulse to the units triggers UA, UB, UC, and UD triggers. This advance pulse would advance the address register from address 233 to address 235.

On TR2 cycles A35 will be satisfied during Clock 2–2.5 time and Clock 4–4.5 time. The output of A35 samples leg #1 of A6 and A7, thereby applying two advance pulses to the units triggers UA, UB, UC, and UD which advances the address register from address 235 to address 239 at which address it will stay until the first cycle of the next print scan.

As previously stated, the address register will advance three addresses on the first cycle of the next print scan because the units trigger U1 is turning off. This advances the address register to position 2, representing the fact that the 2nd graphic on the chain/train is in front of print position 2 which is being addressed on this cycle. If units 1 trigger U1 had been off during TR2 cycle, A36 would have been satisfied during Clock 6–7 time between delayed oscillator pulses. A36 satisfies O33 whose output samples leg #1 of A6 and A7 thereby applying an advance pulse to the units UA, UB, UC and UD triggers. This advances the address register 2 extra addresses to compensate for the advance of only one address on the first cycle of a print scan when the units U1 trigger turns on.

At the end of the print operation when the print trigger turns off, A4 and A12 will again be satisfied by SS1 pulses. The first SS1 pulse after a print operation will still advance the address register under "MOD+2" control in order to maintain proper synchronism with the chain/train. This means that if the units trigger U1 turns on, the address register will advance one address and if the U1 trigger turns off, the address register will advance 3 addresses. On SS2 after the print trigger turns off, A37 will be satisfied, thus turning the "MOD+2" latch off. This deconditions leg #1 of O8 thus causing the address register to advance one address with every SS1 pulse until the next print operation.

From the above description and accompanying drawings, it will be seen that the invention provides a closed loop addressing concept which saves the cost of side entry latches. The address register provides convenient closed loop addressing and minimizes the number of extra advances required at the end of each print subscan (advance by 120 once, by 12 twice, and by 2 3, 4 or 5 times). The quadrant setup simplifies advancing of the units ring and the closed loop concept provides for much better synchronization checking, since the address register is free-running and is only reset for re-synchronizing. The closed loop concept also gives an automatic check of the data storage addressing during printing. The data storage address register should advance 43 times during each print subscan, terminating when addresses 130, 131 or 132 are reached. The character storage address register should also advance 43 times during these print subscans. If the data storage address malfunctions, other than 44 memory cycles will be taken on a print subscan, and a synchronization check will result, since the character storage addressing register will be out of synchronism with the chain/train at home time.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Printer control apparatus comprising in combination, type carrier means having a plurality of graphic symbols thereon movable past a print line having a plurality of print positions, a plurality of print impression devices for obtaining impressions of said symbols at said print positions, data storage means having a plurality of addressable positions for storing coded representations of symbols to be printed at said print line, character storage means having a plurality of addressable positions for storing coded representations of the graphic symbols of the type carrier means, a set each of X and Y drive lines selectively energizable to address different ones of said positions, means for selectively activating different ones of the X and Y drive lines including switch means individual to different ones of the X and Y sets of drive lines, the switch means for at least one set of drive lines being arranged in groups with the odd numbered address positions associated with one group and the even numbered address positions with the other group, and means for cyclically comparing the coded representations in the data and character storage means to effect operation of an impression means associated with a print position upon equal comparison of coded representations in the data and character storage means, said means for comparing including bistable means connected to apply a set signal to at least one of said groups of switch means to select one of the plurality of groups of addressable storage positions and addressing means biasing said switch means to select one each of said X and Y drive lines for selecting from said one group a particular position.

2. In a high speed printing apparatus, the combination in accordance with claim 1 in which a pair of bistable devices are connected to apply set signals to one each of the X and Y groups of switch means to select one of four groups of addressable storage positions.

3. In a high speed printing apparatus, the combination in accordance with claim 2 in which the addressing means comprises units and tens addressing rings with the units ring being so connected to the switch means that the odd address postiions are in one group and the even address positions in another so that the operation of one of the bistable devices determines whether the positions are addressed alternately odd-even or sequentially odd and then sequentially even.

4. In a high speed printing apparatus, the combination in accordance with claim 3 in which the bistable devices are triggers which are connected to be selectively operable to apply set signals to one group of each the X and Y drive line switch means which are settable magnetic core devices to select a group of addressable positions in one quadrant of the character storage, and a pair of registers are connected to apply bias signals to a particular magnetic core switch means of each group to select only the particular position in the selected quadrant.

5. The combination in a high speed printing apparatus having a print line with a plurality of impression devices of type carrier means having a plurality of graphic symbols thereon advanceable past said print line, character storage means having a plurality of addressable positions for storing codes corresponding to each of said graphic symbols, data storage means having a plurality of addressable positions for storing coded data representing characters to be printed by an associated impression device at said print line, and having X and Y drive lines selectively energizable to select different ones of the addressable positions, means for dividing the addressable positions of the data storage means into a plurality of groups including groups of switchable core means inductively coupled to the X and Y drive lines, means for cyclically selecting coded data representations from said positions of the data storage means in accordance with advance of said carrier means, means including a pair of triggers selectively operable to provide a set signal to one group of X drive line switch cores and one group of Y drive line switch cores to select one of a plurality of groups of addressable positions in the character storage means, additional means providing bias signals to one of the switch cores in each of the X and Y groups co-operative with the set signal for selecting a particular addressable position in the selected group, and means responsive to a comparison between coded representations in the selected positions of the data and character storage means for selectively effecting operation of said associated impression devices.

References Cited

UNITED STATES PATENTS

| | | | |
|---|---|---|---|
| 2,918,865 | 12/1959 | Wooding | 101—93 |
| 2,993,437 | 7/1961 | Demer et al. | 101—93 |
| 3,064,561 | 11/1962 | Mauduit | 101—93 |
| 3,066,601 | 12/1962 | Eden | 101—93 |
| 3,196,404 | 7/1965 | Furlong et al. | 340—172.5 |
| 3,282,205 | 11/1966 | Cogar | 101—93 |

WILLIAM B. PENN, *Primary Examiner.*